T. CRANEY.
Saw-Mill Dogs.
No. 150,534. Patented May 5, 1874.
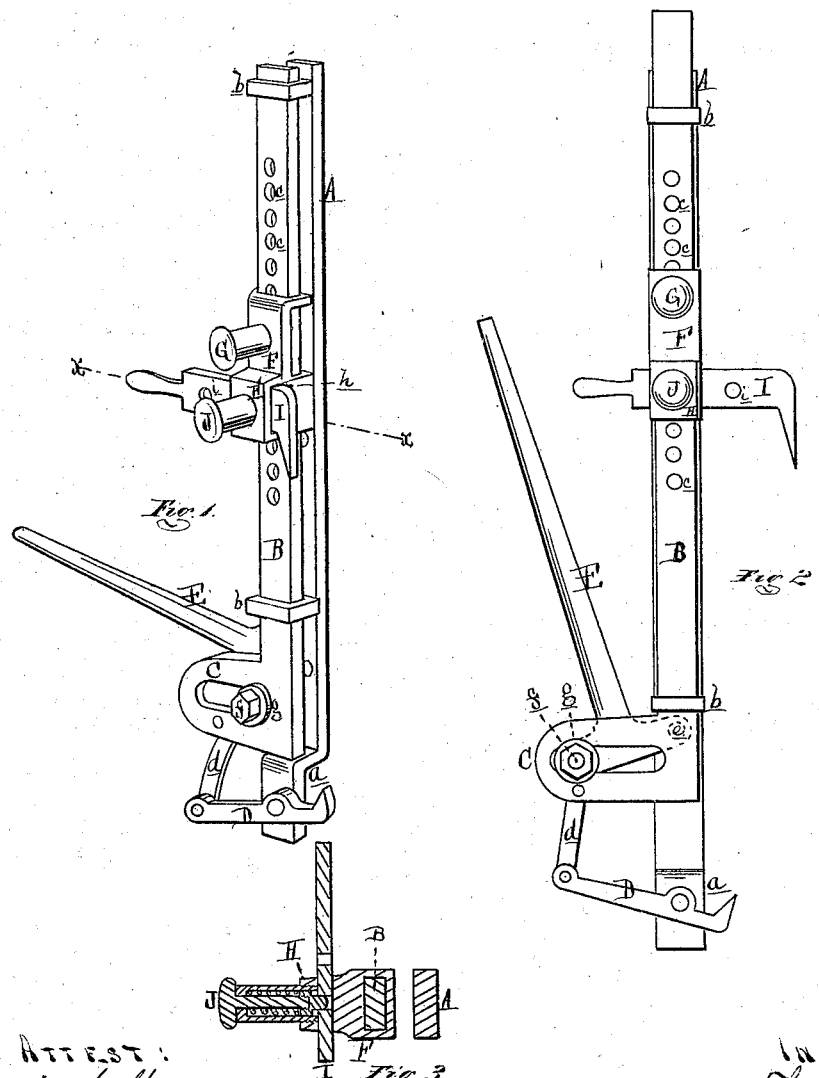

UNITED STATES PATENT OFFICE.

THOMAS CRANEY, OF BAY CITY, MICHIGAN.

IMPROVEMENT IN SAW-MILL DOGS.

Specification forming part of Letters Patent No. 150,534, dated May 5, 1874; application filed March 13, 1874.

*To all whom it may concern:*

Be it known that I, THOMAS CRANEY, of Bay City, in the county of Bay and State of Michigan, have invented an Improvement in Saw-Mill Dogs, of which the following is a specification:

The nature of this invention relates to an improvement in dogs for circular saw-mills, its object being to so construct the same as to enable the sawyer to readily secure the log, before it has been slabbed, to the carriage, and to secure the cant in such a manner that it can be sawed up to the last inch-board without again adjusting the dogs.

Figure 1 is a perspective view of my invention. Fig. 2 is a side elevation; and Fig. 3 is a cross-section on $x$ $x$, Fig. 1.

In the drawing, A represents a bar which sustains the working parts of my device, and which should be securely bolted to the side of the knee of the carriage. This bar A is provided with an offset, $a$, at its lower end, and with guides $b$. B is a guide-bar which moves in the guides $b$, and is provided with a link, C, at its lower end, and with perforations $c$. The link C is connected to the dog D, which is pivoted to the lower end of the bar A by a connecting-bar, $d$. E is a T-lever, one arm of which is pivoted to the bar A at $e$, while the other arm is provided with a stud, $f$, upon which is sleeved a friction-roller, $g$, which plays in the slot of the link C. F is an adjustable slide moving on the guide-bar B, being secured at any desired elevation by a spring-bolt, G, which enters one of the perforations $c$ in the bar B. On the outer face of the slide F is an offset, H, in which is formed a rectangular slot, $h$, through which is inserted an adjustable dog, I, the latter being provided with perforations $i$. J is a spring-bolt, secured to the outer face of the offset H, which engages with one of the perforations $i$, thus holding the dog I rigidly in place.

As the log is rolled upon the carriage, the lever E is thrown up into the position shown in Fig. 2, and the dog I adjusted as shown in same figure, allowing the log to roll close to the face of the knee. The lever is now thrown down to the position shown in Fig. 1, which forces the dog I into the top of the log, rigidly securing it to the carriage. After the log is slabbed or squared, the lever is thrown up into its original position, releasing the dog I from its engagement. This latter is then retracted to the position shown in Fig. 1. The cant can now be rigidly secured to the carriage, and entirely sawed up to the last inch-board without again having to adjust the dogs, the dog D catching into the bottom of the cant at the same time that the dog I enters the top.

What I claim as my invention, and desire to secure by Letters Patent, is—

1. The combination of the bar B, slide F, spring-bolts G J, with the adjustable dog I, substantially as set forth.

2. The combination of the bar B, slide F, spring-bolt G, dog I, spring-bolt J, with the lever E, connecting-bar $d$, and dog D, substantially as and for the purposes set forth.

THOMAS CRANEY.

Witnesses:
CHAS. E. HUESTIS,
H. S. SPRAGUE.